United States Patent [19]
Greaney et al.

[11] Patent Number: 5,796,729
[45] Date of Patent: Aug. 18, 1998

[54] INTEGRATED TELECOMMUNICATION SYSTEM ARCHITECTURE FOR WIRELESS AND WIRELINE ACCESS FEATURING PACS RADIO TECHNOLOGY

[75] Inventors: Shaun J. Greaney, Tinton Falls; Kenneth W. Leland, Middletown, both of N.J.

[73] Assignee: Bell Communications Research, Inc., Morristown, N.J.

[21] Appl. No.: 641,161

[22] Filed: May 9, 1996

[51] Int. Cl.$^6$ .................................................. H04Q 7/22
[52] U.S. Cl. ........................... 370/345; 370/423; 455/463
[58] Field of Search .............................. 455/462, 463, 455/465, 509, 517, 524, 525; 370/310, 336, 345, 423, 463, 475

[56] References Cited

U.S. PATENT DOCUMENTS 5,121,391  6/1992  Paneth et al. ............................ 370/345
5,175,727  12/1992  Maher et al. ............................. 370/423
5,241,537  8/1993  Guilliford et al. ....................... 370/340
5,283,817  2/1994  Hara et al. ............................... 455/463
5,544,222  8/1996  Robinson et al. ........................ 379/58

*Primary Examiner*—Benedict V. Safourek
*Attorney, Agent, or Firm*—Joseph Giordano; Loria B. Yeadon; David A. Hey

[57] ABSTRACT

Disclosed is a telecommunication system that is both highly cost effective for small scale applications (for example, those having less than 80 lines), yet field upgrade-expandable to applications having a significant number of additional lines (for example, 30,000 lines). An integrated voice/data telecommunication system is utilized that is flexible enough to handle low bandwidth (for example 64 kbps mu-law) speech as well as high bandwidth multimedia data switching. The system may be configured as a low cost, standalone PACS system for "village telephony" or "PACS-on-POTS" applications, as an alternative to requirements for PACS infrastructure when appropriate wireless network facilities are unavailable.

9 Claims, 3 Drawing Sheets

INTEGRATED TELECOMMUNICATION SYSTEM ARCHITECTURE FOR WIRELESS AND WIRELINE ACCESS FEATURING PACS RADIO TECHNOLOGY

FIELD OF THE INVENTION

This invention relates to an integrated telecommunication system that provides both wireless and wireline access. More particularly, this invention relates to a system for providing both voice and data telecommunication which is cost effective, upgradeable, and capable of use in both wireline and wireless environments.

BACKGROUND OF THE INVENTION

Various systems have been developed and implemented to match the explosive demand for high-quality wireless communication. Moreover, with the increased use of wide area networks (such as the Internet), there has been a tremendous demand for systems which support data communication.

Personal Communications Systems (PCS) are now being developed to meet these demands. PACS (Personal Access Communications Systems) is one such PCS that was developed to support voice, data, and video images for indoor and microcell use. PACS utilizes digital voice coding and digital modulation, and is designed to support low-speed, portable use.

As shown in FIG. 1, PACS architecture comprises four main components: fixed transceivers 4 or portable transceivers 2 known as subscriber units (SUs); fixed base units 6 known as radio ports (RPs); a radio port control unit (RPCU) 8; and an access manager (AM) 10. Each fixed RP 6 communicates with a number of SUs 2 and 4 through an interface A (the air interface) in a manner which permits each SU to simultaneously access that port on a multiplexed basis.

In PACS, low power multiplexed radio links provide a number of separate, fully duplex demand-assigned digital channels between an RP and each of its associated SUs. Each RP transmits bit streams on a pre-defined carrier frequency. In turn, each SU that accesses an RP responds by transmitting a burst on a common, pre-defined carrier frequency. With licensed PACS, a large number of radio frequency (RF) channels are frequency division duplexed with an 80 MHz separation. A variant of PACS, PACS-UB was developed within the United States for the unlicensed PCS band within 1920 and 1930 MHz. PACS-UB utilizes time division duplexing rather than the frequency division duplexing utilized in the original PACS standard.

Some of the advantages of PACS arise from its reliance on relatively small-sized base stations (RPs). Being both small and relatively inexpensive, RPs can be widely deployed on utility poles, on buildings, in tunnels, indoors or outdoors, so as to provide more comprehensive support for wireless access services. With its relatively small power needs, an RP can be line or battery powered.

Both PACS and PACS-UB permit wireline-quality voice and data communications services at a price and with a capacity approaching wireline techniques. These standards are particularly well suited for use in several environments, including: (1) wireless local loop environments; (2) low mobility/high density public access PCS environments; and (3) in-building (residential or business) telephony and data environments.

For wireless local loop environments and low mobility/high density public access PCS environments, PACS relies on a system architecture which is based on Advanced Intelligent Network (AIN) and Integrated Services Digital Network (ISDN) wireline network principles. AIN is intended to allow users to have a single number for both wireless and wireline services and to permit a more seamless handoff as a subscriber moves from one location to another. One AIN architecture consists of three levels: the intelligent level; the transport level; and the access level. The intelligent level contains databases for the storage of information about network users. The transport level handles the transmission of information. The access level provides access for each user in the network and contains databases that update the location of each user in the network.

ISDN is a complete network framework which utilizes common channel signaling (CCS), a digital communications technique that provides simultaneous transmission of user data, signalling data, and other related traffic throughout a network. ISDN provides a dedicated signalling network to complement the public switched telephone network PSTN. It provides a network for signalling traffic that can be used to either route voice traffic on the PSTN or to provide new data services between network nodes and the end-users.

While useful in the above-noted environments which include AIN and ISDN capabilities, PACS architecture may not be suitable for wireless loop or mobility PCS applications where there is no existing wireline AIN or ISDN infrastructure. Further, PACS appears to have extremely limited applicability to in-building wireless systems, especially in small business settings. Within the small business environment, the Small Computer Systems Architecture (SCSA) may be utilized. SCSA is an open industry specification for computer-based telephony systems. The SCSA architecture consists of 32-card nodes with local, non-blocking time slot interchange SCbus backplanes that are hierarchically connected in up to 16-node systems via a SCxbus. A non-blocking SCbus preassigns transmit slots at system configuration, thus limiting the dynamic configurability of the 16.384 Mbps (4048 octet/frame) SCbus.

In addition to having limited dynamic configurability, node to node data traffic in an SCSA system may require routing on three busses: the two SCbuses in the two nodes and the interconnecting SCxbus. Control messages are routed on a separate, multi-master contention bus. Thus, a relatively high degree of switching is required to provide hardware connectivity.

Apart from SCSA systems, other conventional architectures often utilized in the small business environment includes various key system and PBX architecture commercially available from telecommunications equipment manufacturers. Key systems typically serve less than 125 lines; small PBXs typically serve 125 to 1000 lines, medium PBXs 1000 to 10,000 lines, and large PBXs greater than 10,000 lines. Frequently, different system architectures are applied to products in each of these groups. Thus, it is extremely difficult to modify an existing system to provide additional lines as a number of user increases. As a result, scalability is relatively limited with such systems.

In view of the foregoing, there is a need for an architecture which can furnish the advantages of PACS and PACS-UB wireless access technology in a "village telephony" environment (that is, one characterized by a high density of low mobility users) (for PACS) and in an in-building telephony and data environment (for PACS-UB), particularly in a low-cost, modular way. To avoid making any detailed wireline infrastructure assumptions, there is a related need for an architecture that is capable of providing a "standalone"

PACS capability, that is, one that can exist without preexisting AIN or ISDN architecture.

SUMMARY OF THE INVENTION

In addressing these needs and others, we have developed a design which recognizes the importance of modularity and of integrated support for a large range of telecommunications services. Modularity, both in terms of system cost and in the amount of system hardware, is an important attribute because a village telephony system or an in-building voice and data system could span three orders of magnitude in the number of supported terminals. Further, in view of the explosive growth in demand for data connectivity (fueled largely by Internet access), it is desirable that the system be capable of supporting a range of telecommunication services. Integrated support for wireline access as well as wireless access is extremely desirable, whether to provide for wireline voice terminals in a business communication setting or to achieve significantly higher data communication rates than is feasible with PACS wireless technology.

It is therefore an object of our invention to provide a telecommunication system that is both highly cost effective for small scale applications (for example, those having less than 80 lines), yet field upgrade-expandable to applications having a significant number of additional lines (for example, 30,000 lines). It is a further object of the invention to provide an integrated voice/data telecommunication system that is flexible enough to handle low bandwidth (for example 64 kbps mu-law) speech as well as high bandwidth multimedia data switching. Further, it is an object of the invention to provide a low cost, standalone PACS system for "village telephony" or "PACS-on-POTS" applications, as an alternative to requirements for PACS infrastructure when appropriate wireless network facilities are unavailable.

As described in greater detail below, our invention provides a significantly higher bus bandwidth (1.0486 Gbps) that is dynamically allocated, thus allowing the system to take advantage of usage statistics. Further, with our invention, all data and control traffic use a common 32-bit wide backplane. A small system may be implemented in a single card cage. Larger systems use multiple card cages that are interconnected in a ring arrangement via single, high-bandwidth, serial fiber links. No switching is necessary in the hardware providing inter-cage connectivity.

In contrast to prior art key systems, the invention gracefully scales from applications requiring very few lines (for example, less than ten) up to systems with 30,000 lines. Finally, the system backplane has sufficiently large bandwidth to support high-speed wireline connectivity to desktop computing stations. In addition to voiceband-rate voice and data connectivity to desktop and wireless voice and data terminal equipment.

Other advantages of the invention will be apparent to those skilled in the art in view of the description set forth below.

BRIEF DESCRIPTION OF THE DRAWINGS

In the drawings:

FIG. 5 is a diagram of address word bit assignments in accordance with the invention.

FIG. 6 is a diagram of an address data word in accordance with the invention.

DETAILED DESCRIPTION OF THE PREFERRED EMBODIMENTS

The following is a description of preferred examples of the invention. First, a description of a single-cage embodiment of the invention is described. As explained below, this system is particularly well suited for use in a wireless local loop environment, a "village telephony" environment, and/or an in-building environment. A multi-cage example is also discussed which illustrates the scalability provided by the invention.

Figure 2:
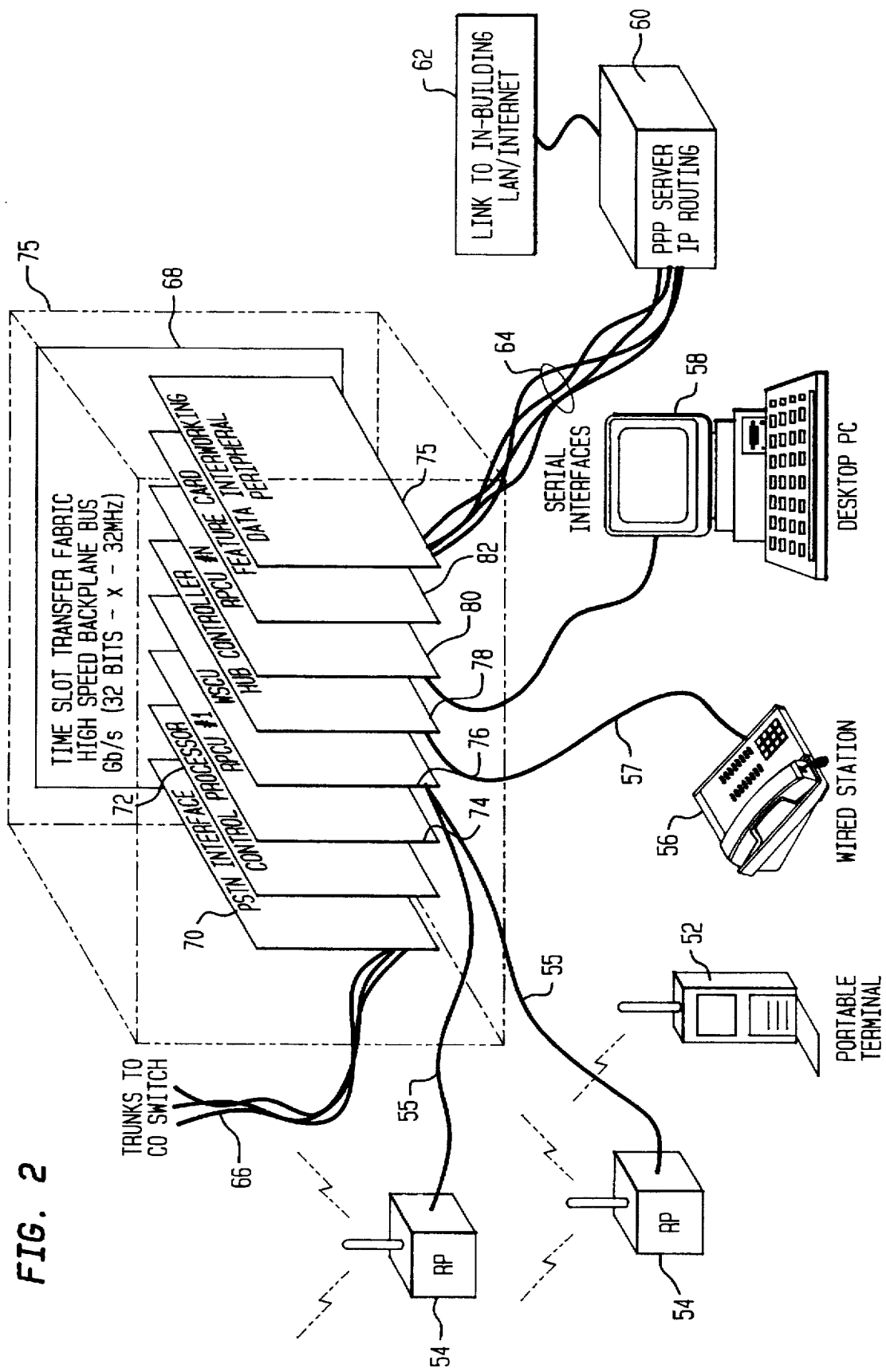
FIG. 2 is a block diagram of a telecommunications system in accordance with an embodiment of the invention.

FIG. 2 is a diagram showing a single-cage example in accordance with the invention. A telecommunications system 50 includes a unit 75 which provides voice and data access for various communication devices. As explained below, this system provides wireless and wireline voice and data communication among various types of terminals arranged in different networks. In this example, the system provides access among "stand-alone" terminals and among; terminals in the PSTN; terminals in a PACS-based wireless network; terminals in a wide area network (WAN); and terminals in a local area network (LAN).

As shown, trunk lines 66 lead to a central office (CO) switch which forms a part of the PSTN. Serial interfaces 64 provide access to a PPP server 60, which may connect to a LAN 62. This architecture similarly may support a router (such as an Internet Protocol (IP) router) that links with a WAN (such as the global Internet).

One or more standalone terminals, such as a desktop personal computer 58 may also access the system 50 for data (or voice) transfer. Similarly, one or more voice terminals, such as wired station 56, provides wireline voice access.

As illustrated, the system 50 supports PACS or PACS-UB architecture. One or more RPs 54, each of which may service a plurality of terminals, such as portable terminal 52, is connected to the PSTN and the other networks illustrated through the unit 75. This architecture is particularly suitable for a relatively dense distribution of wireless low-mobility users.

The card cage 75 through which these interconnections are made principally contains a backplane bus 68 that connects a control processor card 72 and several peripheral cards 70, 74, 76, 78, 80, and 82. The backplane bus 68 provides high-speed communication among the various peripheral devices and networks connected to the unit 75. Using the addressing scheme described in greater detail below, the backplane bus 68 provides a message stream or an information stream communication path between any two system entities under control of the control processor card 72, hereinafter referred to as the control unit (CU).

In this example, the peripheral cards comprise a PSTN interface card 70, a plurality of RPCU cards 1 to N (represented by cards 74 and 80), a wired station control unit card (WSCU) 78, a hub controller card 78, a feature card 82 and a data interworking peripheral card 84. A general description of each of these peripheral cards is now set forth.

The PSTN interface card 70 serves as the primary network interface peripheral to support telephony services. The trunks 66, which may either be analog or digital, provide a line interface from a local exchange central office. In addition to either analog POTS or ISDN interfacing, the PSTN interface card is responsible for transcoding speech between 32 kb/s ADPCM (used over the air and on the backplane) and either analog waveforms or 64 kb/s PCM. Several wire drops may interface with the PSTN interface 70. However, if only two-wire drops are provided, and the two-to-four wire hybrids are located out in the plant or in the central office, then this peripheral may also be required to implement echo control measures.

With a single card-cage system (or where a chain of card-cage control units are utilized in accordance with the embodiment described below), the initial PSTN interface card terminates analog POTS lines and makes them available as external line appearances for voice terminals. Dialing information is communicated from the system control unit card 72 to the PSTN interface card 70 via the backplane virtual control channel. Call progress tones are digitized and passed in band via one of the assignable backplane time slots back to the client voice terminal.

Figure 1:
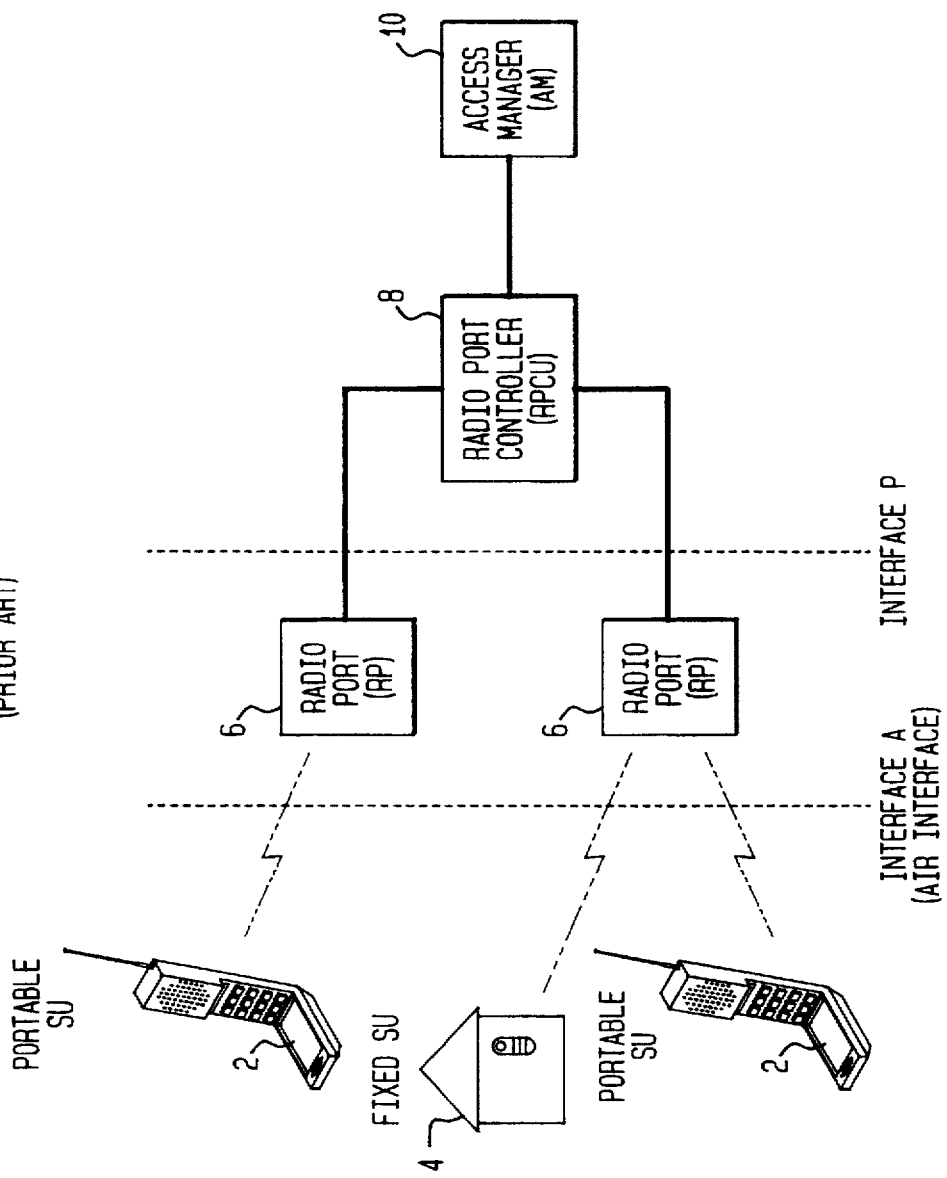
FIG. 1 is block diagram of conventional PACS architecture.

The RPCU cards 76 and 82 provide a centralized architecture to support the radio-specific functions described generally in reference to FIG. 1. In accordance with the architectural philosophy of PACS and PACS-UB, each RPCU services a plurality of RPs 54 which in turn provide wireless access to several SUs 52. As known in the art, the RPs 54 have limited functionality, in order to allow high density coverage of a service area at minimum cost. The RPs 54 provide a high performance modem capability, translating downlink (RPCU to SU) information streams from baseband to RF, and conversely, translating uplink (SU to RPCU) information streams from RF to baseband with error detection. As shown, the RPs 54 are interfaced to the RPCU peripherals (cards 76 and 80 in this example) via standard twisted pair distribution wiring.

A twisted pair interface to the remote radio port electronics supplies both a full duplex digital link and DC power. In a large PACS-UB system, the remote port electronics may be remote a significant distance from the system controller. In order to increase the reliability of the link, it is desirable to minimize the signaling rate between the ends. For example, since the air interface rate of 384 kb/s is shared in a time division fashion, each half-duplex direction could use a FIFO buffer to rate adapt the line interface to 192 kb/s.

The RPCU peripherals 76 and 80 terminate many of the radio-specific PACS protocols. Each handles SU requests for air interface resources, and makes requests for bus and other peripheral resources, such as the network interface via elements 64, 60 and 62. In addition, because the RPCU maintains information about connection status for all timeslots on the RPs that it serves, it can provide high level information and instruction to the RPs in order for the RPs to comply with spectrum use regulations. In this example, a single RPCU peripheral card, such as card 76 or 80, is capable of serving two single-carrier RPs or one dual carrier RP for a total of eight full duplex voice quality (32 kb/s) channels.

In addition to including twisted pair and backplane interfaces, the RPCU peripheral preferably contains a dedicated microcontroller running a small real time kernel. The processor provides the peripheral with the intelligence necessary to communicate with the control unit 72, to manage and communicate with the served RPs and to terminate the higher layer protocols used in link maintenance and call control algorithms.

One or more WSCU cards 78 support the use of wired stations, illustrated by a single wired station 56. While only one such wired station is shown in FIG. 2, each WSCU card 78 can support up to eight stations in a manner which is analogous to the eight full duplex 32 kb/s channels that an RPCU peripheral card can support.

In this example, the wired stations interface with the WSCU card 78 via a single twisted pair that carries phantom power for the wired terminal and time division duplexed TDD digital data for both an in-band fast channel (for example, 64 kb/s mu law PCM) and an out-of-band slow, control channel (key presses to call processing). The WSCU card 78 may, for example, use the PACS layer 3 protocol message (type INFO) to communicate keypress and hook status messages (for the uplink direction) and to control the station display and request user signalling or keypad input (for the downlink direction). The peripheral could also use the same implementation as the RPCU cards 74 and 80 for converting keypress control channel messages into audio channel DTMF, for example, for post-origination dialing applications like voicemail system interaction.

The data interworking peripheral 84 is also consistent with previous architecture definitions for data services in PACs. Functionally, the data interworking peripheral 84 can be viewed as another network interface peripheral, analogous to the line interface peripheral 70, but used for non-voice services instead of voice services. For example, when an SU signals to its serving RPCU to set up a data call, the RPCU requests backplane resources to request service from and communicate information streams to and from the data interworking peripheral 84. The data interworking peripheral then communicates via known data-specific protocols to the data interworking function (IWF). The IWF then handles the specific network interface protocols required by the service. Preferably, the IWF should support IP interworking, for access to both local IP-based enterprise data networks and the global Internet.

CONTROLLER CARD 78:

The proliferation of powerful desktop computers and the need to connect them has created significant demand for computer networking hardware. In contemporary business communication systems there are increasing efforts to integrate computing and telephony hardware, with a primary emphasis on new functionality (e.g., computer/telephony integration). For small businesses in particular, it would be advantageous to provide both voice and basic high-speed data connectivity in the same system architecture, instead of requiring the use of physically separate network hardware for each. Since the system backplane has such significant capacity, it would be feasible to dedicate a number of time slots to the support of high-speed, shared-media data connectivity, and employ a backplane peripheral to arbitrate the use of this resource among connected desktop computers. This peripheral would function very much like a standalone ethernet lab controller, hence the label in FIG. 2.

FEATURE CARD 82:

Added feature functionality could be provided either in system software or in hardware as "feature cards." For example, a set of conferencing bridges could be implemented on a peripheral card with a backplane interface to a low three-way and other multiparty calls to be established.

A fully loaded card cage will contain between 10 and 16 cards. For example, each card may support either eight wired terminals or two PACS-UB RPs. This gives an approximate capacity of eighty (simultaneous) lines per cage, assuming a few of the physical card slots will be dedicated to network interface functions.

The peripherals serving the terminals are supported by the aforementioned high speed backplane bus 68 and a fixed CU 72 that is provided in each unit 75. The CU 72 establishes voice and data circuit switch connections on the high speed digital backplane bus 68 that employs time slot interchange for data exchange. In this particular example, up to thirty-one slave peripheral cards may be plugged into a card cage having a fixed CU and high speed backplane. This architecture provides a low cost system which are particularly useful for relatively small enterprises (such as one utilizing less than 80 lines). At the same time, this architecture permits an elegant growth migration path to much larger systems utilizing greater than 20,000 lines.

Figure 3:
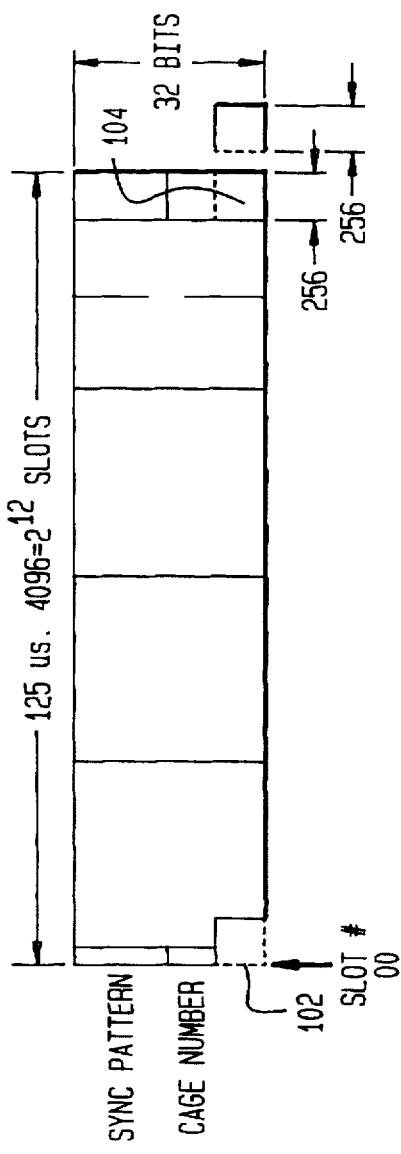
FIG. 3 is a diagram of backplane frame structure in accordance with the invention.

As shown in FIG. 3, the backplane is thirty-two bits wide and has 4096 time slots per frame. Each thirty-two bit time slot is divided into four eight bit octets, each defining four physical channels 0, 1, 2, and 3 (for bits 0–7, 8–15, 16–23, and 24–31, respectively). The frame repeats every 125 μs, a rate corresponding to an 8 kHz voice sampling rate. At 1.0486 Gbps, the backplane provides 16,384 (16 k) octet slots per frame for data and voice communication, with each octet in the frame for providing a 64 kbps unidirectional channel.

In the last 256 time slots of the frame, all four octets (channels 0–3) are dedicated to system control data (reference 104); in the first 256 time slots (reference 102), each lower octet (channel 0) is dedicated to system control data. Thus, more than 15,000 assignable octets remain available for circuit switched data. This would support, for example, 7,500 simultaneous simple full duplex voice conversations and, in turn, could support 30,000 voice terminals, assuming an activity factor of less than 25%.

Figure 4:
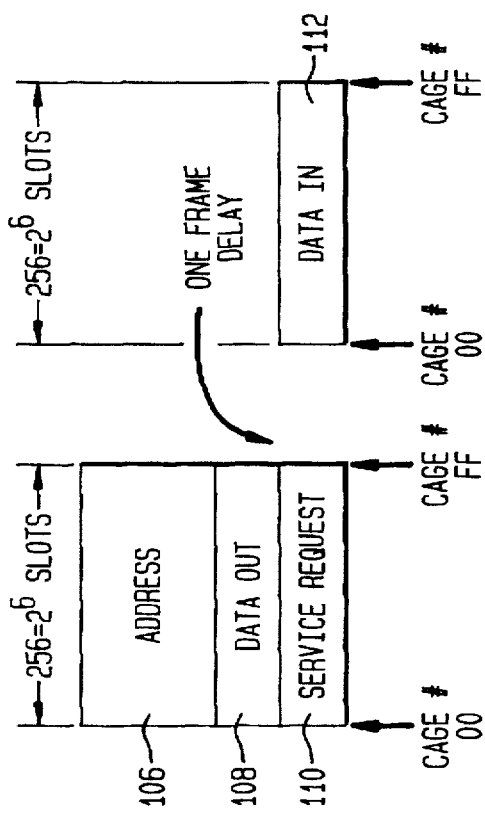
FIG. 4 is a diagram of a control channel in accordance with the invention.

FIG. 4 illustrates the control channel provided in the last 256 time slots of each frame (designated by reference numeral 104 in FIG. 3). Each of the last 256 time slots in frame N is paired with one of the first 256 time slots in frame N+2 and is dedicated to one specific card cage. The upper octets 106 (data bits 24–31 and data bits 16–23) are defined as address bytes that select a specific register on a specific card. The arrangement of the address bytes is illustrated in FIG. 5.

The next octet in each time slot (data bits 8–15) comprises a data byte 108 written from the CU to the slave card. The final octet 110 (data bits 0–7) is reserved for unsolicited service requests from a slave cards to the controller CU. In the first 256 time slots of the frame (reference numeral 102 in FIG. 3), only the lowest octet (data bits 0–7) is dedicated to the control channel. It contains reply data bytes (112 in FIG. 4) from slave cards to the system CU. All told, there are five octets dedicated to each cage for bidirectional communication with the CU. For example, physical channel 0 (the first octet) of time slot 0 and physical channels 0–3 (all four octets) of time slot 3840 (slot 0 of the last 356 slot block) are dedicated to cage 0. Likewise, physical channels 1 and 3841 are dedicated to cage 1 and so on.

As shown in FIG. 4, there is up to one frame of delay from the output of the final cage N (hexadecimal FF) to the input of cage 0 (hexadecimal 00). This delay is included to compensate for the unpredictable aggregate delay from the N parallel-to-serial-to-parallel conversations (one conversion set per cascade) which take place. Thus, the maximally configured system would have 255 card cages.

To address a specific register on a specific card in a specific cage, a combination of control channel slot location and 16 bit address is used. For example, for the first cage (cage 0) in a system, physical channels 2 and 3 of time slot 3840 are concatenated to provide 16 bits of addressing for data message communications. Bit 15 (the most significant bit) is the Read/Write bit, and bits 10–14 are used to address one of the possible thirty-two card locations in the cage. The remaining ten bits (0–9) are available for peripheral card register addressing (see FIG. 5).

Each cage has one of the last 256 time slots dedicated as a control channel from the slave cards in that cage to the system CU. The lower octet 110 in that time slot is reserved for unsolicited service requests from a slave card to the call processing CU. This octet is a shared resource among the cards in the cage. A wired-AND control line is provided for self-arbitration. Each card is keyed to a particular physical slot, for example, a card in physical cage slot number 3 will know it is in slot 3 by examining five hard wired address lines passed to it via the backplane connector. If a card in slot 1 desires to access the service request octet, it must pull a service request arbitration control line low sometime within the first sixty-four time slots of the frame. If a card in slot 2 desires the service request octet, it first examines the control line to determine if card 1 has seized control of the octet, then, if not, it will pull the control low sometime within the second sixty-four slots of the frame. This continues for the first thirty-two time slot groups so that by the time the control channel arrives only one card is granted access to the service request octet.

With this architecture, the data path from a slave card register to the CU is provided by physical channel 0 of time slot 0. Because of the one-frame time delay inherent in reverse communications from cages 1 to 254 to cage 0, cards residing in cage 0 are required to delay reply data for data reads for one frame, as mentioned above in reference to FIG. 4. Thus, cage 1 would use time slots 1 and 3841, cage 2 time slots 2 and 3841, and so on.

The broadcast channel utilized in the invention is critical to the functionality of the higher layer PACS protocols. PACS-UB specifies common layer 2 and layer 3 protocols with PACS, to enhance interoperability between licensed and unlicensed systems. At various times, the fixed system infrastructure must stream various information out to the portables over the air. This information includes the system information channel, with such items as port ID, system ID and access rights, registration area ID, encryption modules, or messages to change portable parameters; and the alert channel, on which alert or "ringing" message are sent to inform registered, inactive portables that an incoming call has been received for them. Many of these items could be downloaded once from the system controller to the RPCU peripherals at system power-up, and the formatting of this information into the proper messages at the proper times could be done by the RPCUs. However, the controller must intervene in real time in order to process incoming call requests and create alert messages, that are then broadcast over the alerting area (which is the entire system in this case). As explained above, our method to implement a broadcast capability for the system controller uses a control channel timeslot (slot number 255) for all broadcast messages (see FIG. 4). This reduces the maximum number of cages supportable in a large system by only one cage, to 255, but allows a single message to reach all peripheral cards in all the cages of a system. The implication for the peripheral backplane interfaces is that any given peripheral in cage 254 must be capable of reading two consecutive time slots on the backplane, since the broadcast timeslot and the control timeslot for that cage are adjacent.

Figure 7:
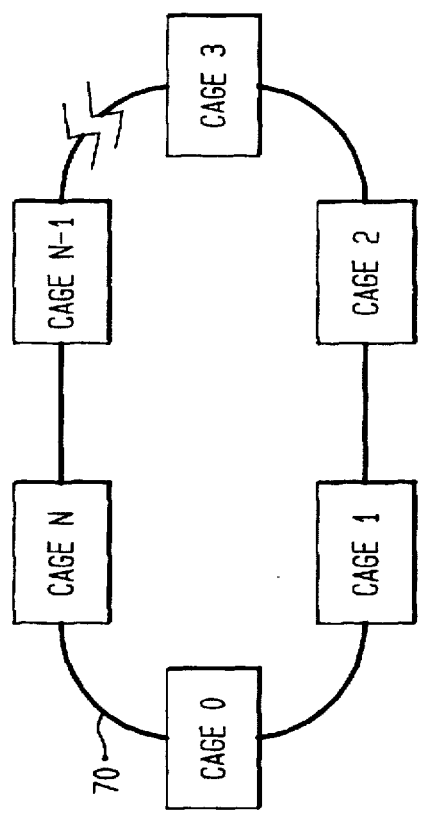
FIG. 7 is a block diagram illustrating a multi-cage system in accordance with the invention.

It is a feature of the invention that the system is not limited to a single cage architecture. For example, in the embodiment shown in FIG. 7, the system can support up to 255 cages that are cascaded with a serial, high speed, fiber link 150. This provides for greater than 20,000 lines in a maximally configured system, while at the same time allowing a minimal system configuration that could support up to eighty lines before requiring a second cage and the cascading hardware. As the system capacity requirements grow, additional cages may be cascaded via a high speed (1.0486 Gb/s) serial link. Each additional cage is connected sequentially in a ring.

In a preferred embodiment of the multi-cage system, the cage controller card resides in card slot address 0 of each cage. It is responsible for providing the backplane 32.768 MHz clock and a separate Frame Start pulse so that the slave cards can synchronize to the backplane timing. The Frame Start line is high during slot 0 of the frame and low otherwise. During slot 0 the cage controller must place the Cage Number in channel 1 so that slave cards know which cage they are plugged into and which control channel to monitor. A synchronization bit pattern is placed in channels 2 and 3 of time slot 0 so that cascade cards may recover frame timing. The cage controller card is either the system CU in cage 0 or a Cascade Card.

The physical address of the card is hardware encoded by 5 backplane lines that are tied to the appropriate level for each card slot. In this way, a card can be plugged in "hot" and within two frame periods (250 μs) it will know what cage it is in and what physical slot it is plugged into. In this way, the card knows which control channel time slot to monitor and which address range to respond to. Thus, a card can be plugged into an operating system, and can automatically determine its address in the system, and send a Service Request to the main Control Unit for configuration.

Simplex time/channel assignments are communicated with fourteen bits contained in two data octets. Two MSB's define the physical channel and the 12 MSBs define the time slot (see FIG. 4). Two hundred fifty-five cages containing sixteen cards each with eight lines per card capacity provides 32,640 line capacity. Four thousand ninety-six time slots with four physical channels less the 256 time slots by five channels of control results in 14,104 simplex channels or 7,552 duplex calls. As noted above, assuming a 25% occupancy this allows for 30,208 lines.

In a single cage system, slot assignments are all made by call processing so only one device is permitted to write access a given time/channel octet. In multi-cage systems, however, a contention exists between the cascading card that is linked to the previous cage and the other slave cards that reside in the same cage. Time/channel octets are still assigned by one CU within the cage, but the cascading card blindly repeats the data found on the backplane of the previous cage with no knowledge of call processing.

Further, a system with N cages results in a variable delay line being inserted between the output of cage N−1 and the input to cage 0, which amounts to exactly one frame of delay feeding back into cage 0 where the full number of cages are used. This maintains the frame slot structure when the loop is closed. This also inserts one frame of delay for the cards in cages 1 through N−1 for reply data to data read commands. Accordingly, cards in cage 0 must recognize their location and insert the one frame of delay themselves to be in an alignment with the rest of the system.

A frame sync word located in the upper two octets of the first time slot of the frame provides for frame and time slot synchronization. Each cage has an M time slot delay referenced to the timing of the previous cage, caused by the parallel-to-serial-to-parallel conversion required in the use of the 1.0486 Gb/s serial link. Since the cage number is displayed in the second octet of the first time slot in each cage, for card address decoding, this will allow the cards in cage N−1 to recognize the (N−1) M time slot delay in their local cage timing relative to the system's cage 0 frame timing. This relative timing information will also be used by the RPCU cards to subtract integer slot times from the frame start timing to allow for system-wide superframe and hyperframe synchronization for all radio ports, as required by the PACS-UB protocol. The resulting time accuracy will be well within 1 microsecond.

The frame sync word is sent non-inverted in the first frame of a sixteen frame superframe. The superframe structure allows for bit scrambling based on a pn sequence sixteen frames in length. This prevents the consistent appearances of the frame sync word that may be embedded in user data.

In cages 1 through N−1, the high speed serial receiver generates the bus clock signals and the frame sync pulls and copies the frame data from the previous cage. This receiver is fairly simple in that it is not required to maintain knowledge of the call processing state. For example, four wired-AND control lines may be used to indicate to the receiver card whether it should write to a specific octet in the frame or tri-state and allow one of the local cards to fill the slot. In the time slot prior to the one in which a slave card will write to the backplane, the slave card must pull the appropriate control line low indicating to the receiver card that it should tri-state that octet in the next time slot. This resolves the above-noted potential conflict between a cascading card and other slave cards in the same cage.

The above described CU functionality may be implemented with a call control software running, for example, on an Intel x86 family processor under a commercially available kernel. Of course other configurations may be used in accordance with the invention.

Since the backplane switching fabric exchanges groups of one or more 64 kbps data streams, the system is very flexible with respect to the nature of the cards plugged into the cages. For example, data interworking cards may be used to support wireless data as per the PACs data architecture. Additional cards for voice path bridging (e.g. for conference or three-way calling), voice messaging, etc. can also be utilized.

Access Management cards may be added to large systems to free up the main CU from tasks such as access authentication and key management for link encryption. In this regard, the PACS specification describes AM functionality that provides a number of services to the radio system. The prototype PACS-UB system implements a portion of those functions as an integral component of the call control software. These functions include: establishment, maintenance and clearance of SU registration records, and assignment of related radio system; authentication and validation of SU registration requests, possibly including decipherment of SU credentials; initiation of SU alerting associated with call delivery, in response to an incoming call service request from a line interface peripheral; and regulation of SU call origination attempts via registration records. The PACS specification call for RPCU-to-AM communication over ISDN channels, with the use of standard National ISDN-1 messages. In a private access telephony/data system, it may be desirable to provide a local AM function to administer the private user group.

Other modifications to the system are also possible. For example, it is conceivable that different RPCU peripherals for different air interface protocols could be specified, given the relative generality of the backplane structure and the call processing software functionality.

Detailed descriptions of preferred embodiments of the invention have now been described in fulfillment of the above objects of the invention. It should be understood that this description is merely illustrative. Many additional variations and modifications which are within the spirit and scope of the invention will be apparent to those skilled in the art.

What is claimed is:

1. In a communication system having a plurality of terminals configured to exchange user communication signals, a device for routing said user communication signals among said terminals comprising:

a backplane bus having a number of modular connection means;

a controller device connected to said backplane bus through at least one of said modular connection means;

a plurality of interface devices connected to said backplane bus, each through at least one of said number of modular connection means, said interface devices being configured to provide said user communication signals through said backplane bus in a format and at a rate determined by said controller device;

wherein said format comprises a time division format in which said user communication signals are divided among a plurality of frames, each frame having a predetermined number of time slots, a first number of said time slots providing system control data and a second number of said time slots providing user data corresponding to said user communication signals.

2. The device of claim 1 wherein at least one of said interface devices comprises a radio control unit which communicates user communication signals in a time division baseband format to and from a radio transceiver, said radio transceiver providing wireless access to one or more radio terminals.

3. The device of claim 1, wherein said time division baseband format is a format specified by Personal Access Communication Systems protocols.

4. The device of claim 1, wherein a portion of said system control data comprises addressing data indicative of a destination residing at one of said plurality of interface devices.

5. The device of claim 1, wherein said addressing data comprises card address data indicative of a location of a selected one of said number of modular connection means and register address data indicative of a register address associated with said selected one of said number of modular connection means.

6. The device of claim 1, wherein said backplane, said controller device and said plurality of interface devices are provided in a modular card cage assembly.

7. The device of claim 6, wherein up to a predetermined number of said interface devices are provided in said card cage assembly as slaves to said controller device.

8. The device of claim 6, further comprising a plurality of modular card cage assembly each containing a backplane bus, a controller device and one or more peripheral devices, respective controller devices of each modular card cage assembly being linked in a daisy chain arrangement by a serial communication interface.

9. The device of claim 6, wherein said serial communication interface transmits data at a rate equivalent to a rate at which data is transmitted through said backplane bus.

* * * * *

UNITED STATES PATENT AND TRADEMARK OFFICE
CERTIFICATE OF CORRECTION

PATENT NO. : 5,796,729
DATED : August 18, 1998
INVENTOR(S) : Shaun J. Greaney - Kenneth W. Leland It is certified that error appears in the above-identified patent and that said Letters Patent is hereby corrected as shown below:

Claim 5, line 1, change "1" to -- 4 --.

Signed and Sealed this

Twenty-first Day of September, 1999

Attest:

Q. TODD DICKINSON

*Attesting Officer*                *Acting Commissioner of Patents and Trademarks*